US011144698B1

(12) United States Patent
Garg et al.

(10) Patent No.: US 11,144,698 B1
(45) Date of Patent: Oct. 12, 2021

(54) METHOD, SYSTEM, AND PRODUCT FOR AN IMPROVED APPROACH TO PLACEMENT AND OPTIMIZATION IN A PHYSICAL DESIGN FLOW

(71) Applicant: Cadence Design Systems, Inc., San Jose, CA (US)

(72) Inventors: Vibhor Garg, Union City, CA (US); Edward J. Martinage, Palo Alto, CA (US); Amit Dhuria, Cupertino, CA (US); Krishna Prasad Belkhale, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/946,677

(22) Filed: Jun. 30, 2020

(51) Int. Cl.
*G06F 30/392* (2020.01)
*G06F 30/396* (2020.01)
*G06F 30/31* (2020.01)
*G06F 30/327* (2020.01)
*G06F 111/12* (2020.01)

(52) U.S. Cl.
CPC ............ *G06F 30/392* (2020.01); *G06F 30/31* (2020.01); *G06F 30/327* (2020.01); *G06F 30/396* (2020.01); *G06F 2111/12* (2020.01)

(58) Field of Classification Search
CPC ...... G06F 30/31; G06F 30/327; G06F 30/392; G06F 30/396; G06F 2111/12
See application file for complete search history.

(56) References Cited

U.S. PATENT DOCUMENTS

| 5,381,524 A * | 1/1995 | Lewis ................. G06F 30/3312 |
| | | 715/804 |
| 9,875,333 B1 * | 1/2018 | Verma ................. G06F 30/3312 |
| 9,922,157 B1 * | 3/2018 | Ebeling ................ G06F 30/398 |
| 2006/0090153 A1 * | 4/2006 | Ho ........................ G06F 30/392 |
| | | 716/113 |

* cited by examiner

*Primary Examiner* — Jack Chiang
*Assistant Examiner* — Aric Lin
(74) *Attorney, Agent, or Firm* — Vista IP Law Group, LLP

(57) ABSTRACT

An approach is described for a method, system, and product, that includes identification/generation of a synthesized netlist for use in optimization and placement, generation and utilization of multiple uncertainty values for an early clock tree for guiding optimization and placed of circuit elements in a placeopt process that operates on a path by path basis. In some embodiments, the approach further comprises execution of clock tree synthesis, and routing the synthesized clock tree. In some embodiments, uncertainty values are propagated along data paths where each data path is associated with an uncertainty value, and where each path is optimized and placed on a path my path basis in order to meeting timing requirements and one or more design goals.

20 Claims, 8 Drawing Sheets

METHOD, SYSTEM, AND PRODUCT FOR AN IMPROVED APPROACH TO PLACEMENT AND OPTIMIZATION IN A PHYSICAL DESIGN FLOW

BACKGROUND

Semiconductor devices are used in a variety of electronic applications, such as personal computers, cell phones, digital cameras, and other electronic equipment. Semiconductor devices are typically fabricated by sequentially depositing insulating or dielectric layers, conductive layers, and semiconductive layers of material over a semiconductor substrate, and patterning the various material layers using lithography to form circuit components and elements thereon.

In order to satisfy customer and consumer desires for ever increasing performance, semiconductors have become more and more complex with more and more semiconductors. As a result, placeopt (placement and optimization) for circuit elements within a layout region has become more complicated. In general, placeopt is a process to determine an initial optimization of respective paths within a circuit and placement operations for the circuit elements within those respective paths of a circuit design. For example, placeopt might comprise determining/modifying the specific combination of circuit elements to use for a give path and a location(s) of those circuit elements within a layout prior to the generation of a completely synthesized clock tree, and prior to final routing operations to generate the connections between those elements.

Current techniques to implement placement and optimization of circuit elements are guided using at least a global uncertainty value based at least in part on an ideal clock tree. Essentially, the ideal clock tree includes gating elements specified in the netlist with zero delay. Based on the overall depth of the clock tree a global uncertainty value is generated that represents a maximum/average or other expected width of a window within which the clock signals are expected to arrive in a completed design. The uncertainty value can be combined with a clock latency to determine when a clock signal will actually arrive. This global uncertainty value is then used to guide optimization and placement of all circuit elements. For example, the uncertainty is used to determine the specific arrangement of circuit elements to use, how close those elements should be placed with regard to each other, the size of gates used (e.g. increasing gate size to decrease the amount of time required to propagate a signal), inserting drivers along transmission paths, or some combination thereof.

However, the global uncertainty value is not particularly well matched to the actual variation that would be experienced on the clock tree at different points. This is because the clock tree when fully defined would include multiple endpoints that are reached through differing numbers of circuit elements (e.g. clock gates and buffers) and different lengths for the signal to traverse. Normally the global uncertainty value is selected based on an average or worst-case uncertainty value expected to be encountered. As a result, some optimization and placement decisions are overly pessimistic in that the amount of time allowed for propagating corresponding clocked signals is far less then would be actually experienced by at least some of those circuits. Unfortunately, correcting this would necessitate changes in the layout and sometimes the circuit elements in order to meet the required timing for respective circuits that would not otherwise be necessary. This can be difficult if not impossible. In fact, in particularly egregious cases, a design might have to be discarded and the process may have to start over because the initial optimization and placement is too far off to be corrected without undue efforts. Regardless of whether the design is so bad as to be entirely unsalvageable or whether the design can be fixed, the application of the global uncertainty value and the issues that it creates wasted time and resources and thus is not desirable.

Therefore, what is needed is an improved approach for guiding placement and optimization processing decisions.

SUMMARY

Embodiments of the present invention provide a method, system, and product for an improved approach to placement and optimization in a physical design flow.

According to some embodiments, the approach includes identification/generation of a synthesized netlist for use in optimization and placement, generation and utilization of multiple uncertainty values for an early clock tree for guiding optimization and placed of circuit elements in a placeopt process that operates on a path by path basis. In some embodiments, the approach further comprises execution of clock tree synthesis, and routing the synthesized clock tree. In some embodiments, uncertainty values or references there to are propagated along clock and/or data paths where each path is associated with an uncertainty value, and where each path is then optimized and placed on a path by path basis in order to meeting timing requirements and one or more design goals.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

DETAILED DESCRIPTION

Figure 1:
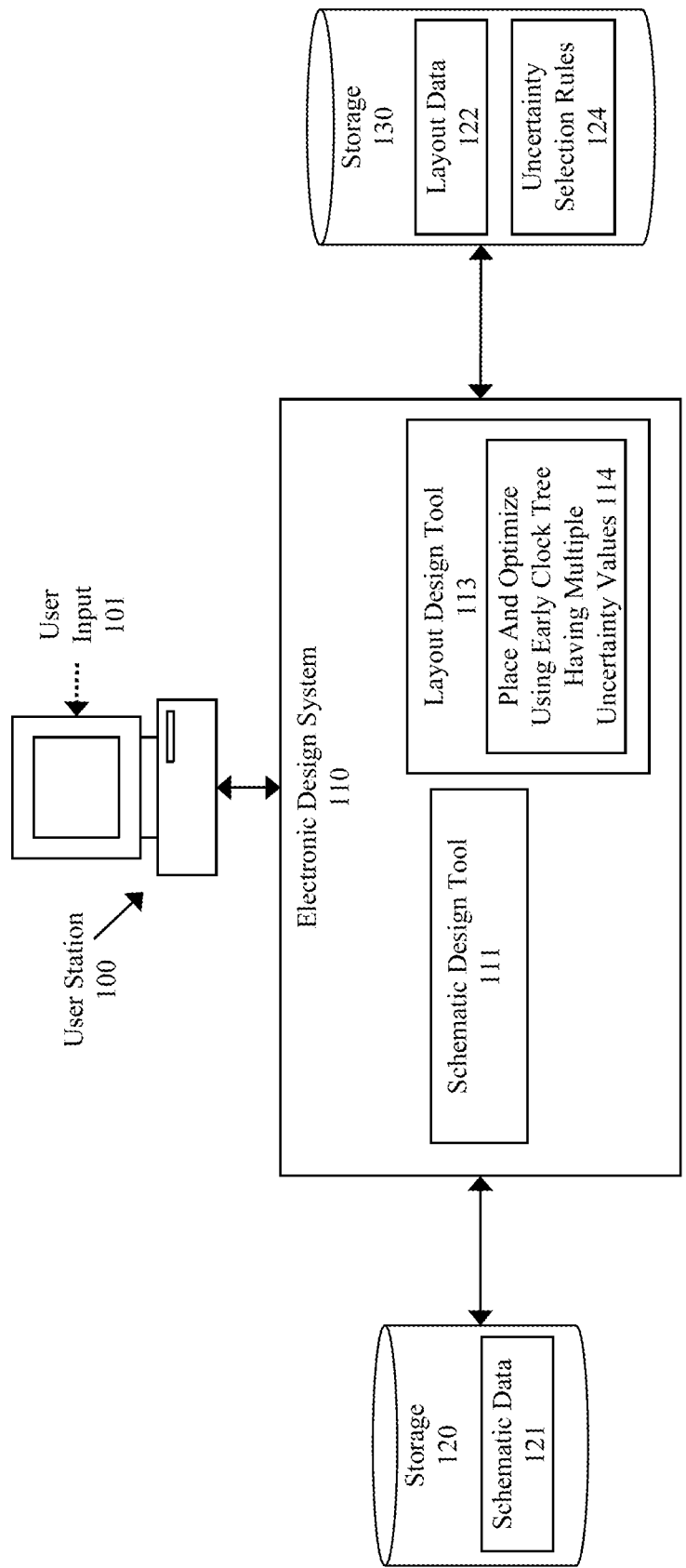
FIG. 1 illustrates an example system for an improved approach to placeopt physical design flow according to some embodiments.

Embodiments of the present invention provide a method, system, and product for reduction of pessimism in placement and optimization in a physical design flow.

Various embodiments are described hereinafter with reference to the figures. It should be noted that the figures are not necessarily drawn to scale. It should also be noted that the figures are only intended to facilitate the description of the embodiments and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated.

Generally, the approach includes identification/generation of a synthesized netlist for use in optimization and placement, generation and utilization of multiple uncertainty values for an early clock tree to guide optimization and placement of circuit elements on a path by path basis, execution of clock tree synthesis after completing placeopt process, and manually or automatically routing the synthesized clock tree and other circuit elements.

In some embodiments, corresponding uncertainty values are computed and propagated across a design between clock circuit elements with different uncertainty values at different clock elements. The approaches disclosed herein may further include any of a set of criteria or rules used to identify candidate locations for generation of uncertainty values, the same or a different set of criteria used to select at least a portion of the candidate locations for computation of uncertainty values, computation of uncertainty values for each branch within the early clock tree and at each input to a clocked circuit element such as a flip-flop or latch. In some embodiments, uncertainty values are propagated along data paths between clocked circuit elements where intersections of data paths associated with different uncertainty values are processed to determine which, or which combination, of uncertainty value(s) is propagated along the data path. In some embodiments, uncertainty values propagated to an intersection point are traced back to a shared uncertainty value on the early clock tree which is then propagated in place of other uncertainty values.

In some embodiments, uncertainty values are also propagated on the clock tree similar to the propagation of those uncertainty values on the data path. In some embodiments, the uncertainty values are not propagated, but reference information or origination information is propagated along a respective path (data or clock). For example, multiple locations on the clock tree are identified, where some locations may be associated with a respective uncertainty value and some locations reference a different uncertainty. Additionally, in some embodiments, information is propagated along the data paths that identify a starting clocked location and that can be used during placement and optimization analysis to select an appropriate uncertainty value to use for analysis of a respective path.

FIG. 1 illustrates an example system for reduction of pessimism in placeopt physical design flow according to some embodiments. Generally, the process includes generating an early clock tree that includes multiple locations that are associated with different uncertainty values. Corresponding uncertainty values are then propagated on signal paths for use in selecting an appropriate uncertainty value for use in placing corresponding circuit elements.

As illustrated, the figure includes a user station 100, storage 120 and 130, and electronic design system 110.

In some embodiments, the user station 100 includes or provides access to the electronic design system 110 and controls the execution of the place and optimize process. For instance, the electronic design system 110 might be located on the user station 100, on a remote device accessed by the user station, or distributed across multiple devices. The user station 100 causes the execution of a place and optimize process that utilizes multiple uncertainty values to guide that placement. The user station 100 comprises any type of computing station that is useable to operate or interface with a database 120. Examples of such user stations include workstations, personal computers, or remote computing terminals. In some embodiments, the user station 100 comprises a display device, such as a display monitor, for displaying a user interface to any users at the user station. The user station 100 also comprises one or more input devices for the user to provide operational control over the user station, such as a mouse or keyboard to manipulate a pointing object in a graphical user interface from which a user input 101 might be received.

The electronic design system 110, as illustrated, includes a schematic design tool 111 and a layout design tool 113. In some embodiments, the layout design tool 113, might be provided separately from a place and optimize tool having the functionality provided in regard to 114, and the place and optimize tool might operate on a schematic in order to generate at least an initial layout provided in layout data 112 discussed herein. In some embodiments, the various components, or the functions, of the electronic design system 110 are combined or separated into different components from those illustrated.

The schematic design tool 111 comprises a tool for creating and/or modifying a schematic of a circuit design. For instance, schematic design tools are generally known in the art and comprise different components for different types of design activities. For instance, one circuit design component might comprise an interface for accepting a hardware description or portion thereof as described by a hardware design language (e.g. Verilog, VHDL, etc.). Another circuit design component might comprise a circuit design component for manually manipulating/creating a circuit design using a circuit schematic. Generally, the schematic design tool 111 operates on schematic data (e.g. schematic data 121 stored in database 120) and can be used to generate a circuit schematic used in semiconductor/electronics manufacturing. In some embodiments, the schematic design tool can represent/synthesize a netlist for a circuit schematic that would be used by the place and optimize process disclosed herein which may be contained/integrated within a layout design tool such as layout design tool 113.

The layout design tool 113, comprises a tool for creating and/or modifying a layout of a circuit design. For instance, layout design tools are generally known in the art and comprise different components for different types of design activities that provide a representation of a physical form of a netlist. For instance, a layout design component might comprise a layout editor for modifying/creating layers of a design as they would be constructed on a semiconductor substrate or printed circuit board. Generally, the layout design tool 113 operates on layout data (e.g. layout data 122 and uncertainty selection rules 124 stored in database 120) and can be used to generate a circuit layout used in semiconductor/electronics manufacturing that corresponds to a netlist. In some embodiments, the layout design tool 113 and/or the electronic design system 110 is modified to include a place and optimize element that uses an early clock tree having multiple uncertainty values 114. The operation of the place and optimize element 114 will be described further below. Briefly, the place and optimize process generates an early clock tree having multiple uncertainty values that are used for corresponding elements to guide optimization and placement of circuit elements on a path by path basis.

The system includes a database 120 which is illustrated has schematic data 121, and database 130 which is illustrated as layout data 122 and uncertainty selection rules 124. In some embodiments, the database 120 and 130 comprises a single database with one or more subsets within the database for the different types of data as illustrated in FIG. 1. However, in some embodiments the database comprises multiple separate databases on different computing systems and/or in different locations connected via electronic communication links (e.g. wired and/or wireless networks). The system may further include a database access module(s) for accessing and storing the data, whether stored at a single database or at multiple databases.

The schematic data 121 comprises any type of representations of a schematic of a circuit design. For instance, the design data comprises any one or more of a hardware descriptive language design, a circuit schematic design, netlist, or any combination thereof. The layout data 122 comprises any types of representations of a physical form of a circuit design. For instance, the design data comprises a circuit layout consisting of a plurality of shapes on a plurality of layers.

The uncertainty selection rules 124, comprise one or more rules to determine which uncertainty values are selected for propagation and which uncertainty values are used to guide the placeopt location selections. In some embodiments, the same rules are used for the selection of uncertainty values for both propagation and for use in placeopt operations. The propagation rules are discussed further below at least in regard to FIG. 5. However, generally, the propagation rules determine which uncertainty value is selected, at least when multiple uncertainty values converge along a data path in a netlist that is being analyzed for placement and optimization of the circuit elements thereof.

Figure 2:
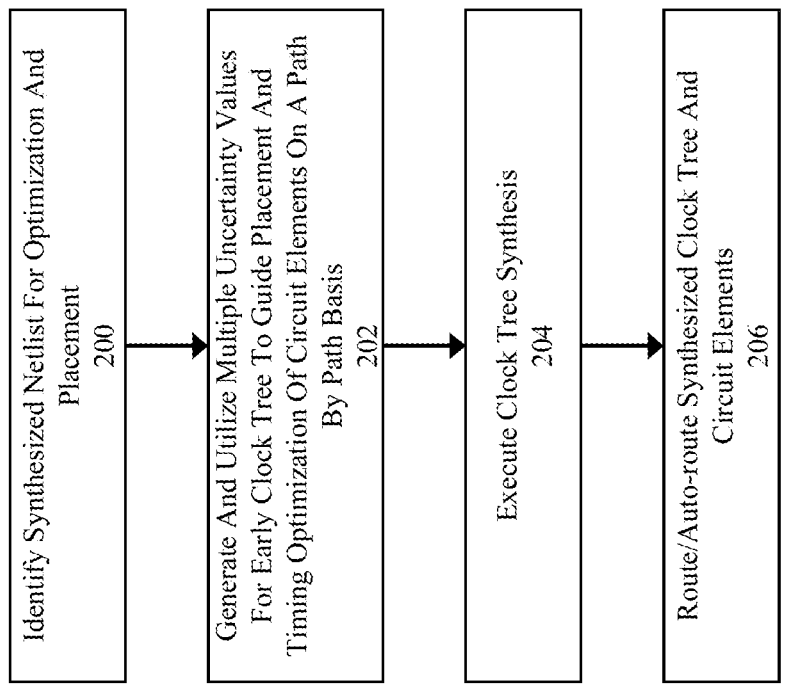
FIG. 2 illustrates a flow for an improved approach to placeopt physical design flow according to some embodiments.

FIG. 2 illustrates a flow for reduction of pessimism in placeopt physical design flow according to some embodiments. Generally, the process includes identification of a synthesized netlist for routing and placement, generating multiple uncertainty values used to guide optimization and placement of circuit elements, execution of clock tree synthesis, and manually/automatically routing the synthesized clock tree and circuit elements.

At 200, the process identifies a synthesized netlist for optimization and placement. For example, a user opens a layout or schematic tool, a design/netlist, and triggers the placeopt process. In some embodiments, a synthesized netlist is generated from a schematic, a hardware design language, or some combination thereof. In some embodiments, a user triggers placeopt process in a placeopt tool by specifying a design with a file.

At 202, multiple uncertainty values are generated for an early clock tree to guide placement and timing optimization of circuit elements on a path by path basis. Generally, this comprises generation/identification of an early clock tree, generation of uncertainty values associated with different locations in the early clock tree, optimization of the circuit layout to meet timing parameters based on corresponding uncertainty values, and guiding placement of different circuit elements using corresponding uncertainty values, as will be discussed further. In some embodiments, both paths between clocked elements and circuit elements are optimized and placed to meet timing constraints using a share uncertainty value for those timed circuit elements that correspond to the respective paths, such as a nearest uncertainty value associated with a shared point within an early clock tree.

At 204, once the placeopt process is completed a full clock tree is synthesized. Generally, clock tree synthesis (CTS) is intended to ensure that a clock signal will get distributed evenly to all sequential elements within a design/layout. More technically speaking, CTS is at least in part intended to minimize skew and latency. Multiple factors can be used to generate the clock tree including at least latency, skew, maximum capacitance, maximum fan-out, and/or a power target/maximum. Moreover, operations can be completed to balance the clock tree including insertion of buffers and inverters, along with modifying/selecting sizing for the gates, buffers, and/or inverters in the clock tree to achieve timing constraints/targets and/or to minimize variation.

At 206, the synthesized clock tree and connections between circuit elements are routed or auto-routed. In some embodiments, some or all of the circuit elements are routed manually by a user. For instance, a user might route the circuit elements manually with the exception of the clock tree. In some embodiments, the result of placeopt process is used in an auto-routing process.

Figure 3:
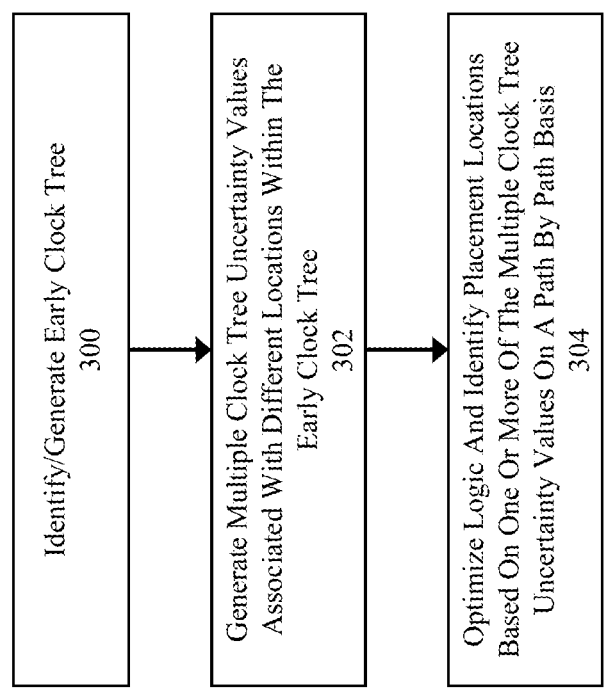
FIG. 3 illustrates a more detailed flow for the generation and utilization of multiple uncertainty values for an early clock tree to guide placement circuit elements as in 202 of FIG. 2 according to some embodiments.

FIG. 3 illustrates a more detailed flow for the generation and utilization of multiple uncertainty values for early clock tree to guide placement and timing optimization of circuit elements on a path by path basis as in 202 of FIG. 2 according to some embodiments. In some embodiments, a clock tree is identified from a schematic and may comprise elements such as clock gate. In some embodiments, a clock tree as defined by a netlist is analyzed to determine a base number of buffers/inverters that would be needed for the design based on fan-out requirements and any other limitations/behaviors of the circuit elements.

At 300, an early clock tree is identified or generated. For example, an early clock tree could be identified as the clock tree specified in the netlist. In some embodiments, a slimmed down version of the early clock tree synthesis process discussed in regard to 204 is implemented here. For instance, buffers and/or inverters are inserted into the clock tree as defined in the netlist to satisfy fan-out requirements such as to provide a target transition time.

At 302, multiple uncertainty values are generated and associated with different location within the early clock tree. This will be discussed further below in regard to at least FIG. 4. However, briefly this process identifies locations in the early clock tree based on a set of criteria such as at branches, at buffers, at inverters, clocked element inputs, or at some combinations thereof, and then generates uncertainty values for at least a portion of those locations based on the elements in the early clock tree. In some embodiments, one or more uncertainty values corresponding to one or more locations are provided by a user, such as via a file or text input which may optionally be used by the placeopt process disclosed herein.

At 304, the process optimizes the underlying logic and identifies placement locations based on one or more of the multiple clock tree uncertainty values on a path by path basis. This process will be discussed further below in regard to at least FIG. 5, and generally comprises identification of corresponding uncertainty values for respective paths/elements such as by propagating those values along respective data paths and implements path optimization as appropriate to meet timing constraints identified based on a corresponding uncertainty value(s), along with placement of those elements of/within respective paths based on the corresponding uncertainty value(s). Path optimizations can include any of changing the sizes and numbers of gates and rearranging/restructuring the logic used for those paths/elements based on one or more corresponding uncertainty value(s).

Figure 4:
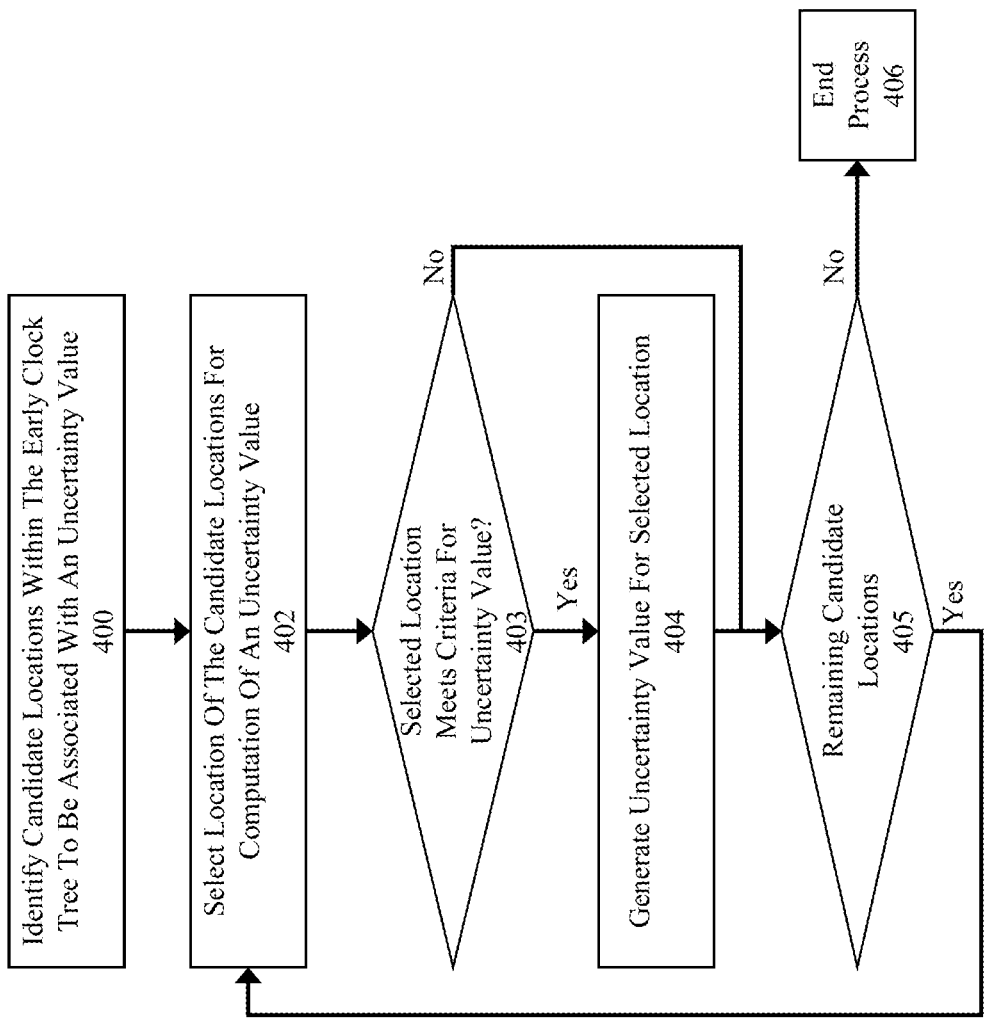
FIG. 4 illustrates a more detailed flow for generation of multiple clock tree uncertainty values associated with different locations within the early clock tree as in 302 of FIG. 3 according to some embodiments.

FIG. 4 illustrates a more detailed flow for generation of multiple clock tree uncertainty values associated with different locations within the early clock tree as in 302 of FIG. 3 according to some embodiments. Generally, the flow identifies candidate locations within the early clock tree for generation of a corresponding uncertainty value and generating uncertainty values for candidate locations that match a criteria for generation thereof. However, in some embodiments, the identification and selection can be merged into a single step where each location is identified and processed serially, and where only locations that should be associated with an uncertainty value is identified.

The flow starts at 400, where candidate locations within the early clock tree are identified. For example, any distinct point on a netlist for the early clock tree is identified as a candidate location, any output of an active circuit element (e.g. clock gates, buffers, and/or inverters), any fan-in/fan-out locations, and/or any other locations that may be specified either manually or as identified based on one or more rules. The candidate values can be represented/maintained using any number techniques. For example, the candidate locations might be identified in a list, a relational database table, as tags associated with the netlist, or some combination thereof. To illustrate, a table is generated that includes an entry for each candidate location where each entry corresponds to a row in the table. The table also includes one or more columns which each correspond to one or more of a location identification, a flag to indicate whether the location has been selected or not, an uncertainty value, a parent identification (uncertainty value/location closer to the root of the early clock tree), one or more children identifications (uncertainty value/location farther from the root of the early clock tree), a branch level, and/or a circuit element level.

At 402, a previously unprocessed location is selected for analysis to determine if the candidate location should be associated with an uncertainty value. In some embodiments, the candidate locations are selected based on any of a previous candidate location that was selected, based on a depth of that candidate location, based on a relative location in the early clock tree, based on an entry or position thereof in a set of data representing the candidate locations, based on the circuit elements or connections that are downstream of the candidate location, or any combination thereof. In some embodiments, at 403, the selected candidate location is analyzed to determine whether it meets a set of criteria for generating an uncertainty value. The set of criteria comprises any subset of the criteria used to identify possible locations as described above and might further comprise a rule(s) based on a comparison with an uncertainty value previously generated for a position on the early clock tree that is closer to the origin of the clock signal. For instance, instead of generating an uncertainty value for each and every candidate/identified location, some locations might inherit a value from a previous location or reference a previous location. One such example might be for locations that are serially in line with each other, an uncertainty value for a location that is closer to the root of the early clock tree might be used for a subsequent location, provided that a predicate condition is met (e.g. subject to a determination that there are no fan-in/fan-out occurrences along the series).

If the candidate location does meet the criteria for an uncertainty value at 403, then an uncertainty value is generated for the selected location at 404. For example, the uncertainty value might be calculated based on the variance between the earliest that the clock signal might reach any one of the endpoint(s) after the selected location and the latest the clock signal might reach any one of the endpoint (s). In some embodiments, the uncertainty for a clock tree element in the early clock tree is computed based on the expected skew with variations in the total delay from the clock tree element to leaves of the tree that drive the clocked elements (e.g. flip-flops, latches, or other clocked elements). The variation is typically computed by user specified early/late derating in addition to the sigma component of the total delay. The sigma computed for the total delay is obtained by adding the variances (square of the sigma) of the individual delays of the gates of the early clock tree in a path and then taking square root of the total variance. In this way the uncertainty is proportional to the largest variance between endpoints (earliest vs latest) and thus can be related to the amount of slack that might be associated with any particular signal path between clocked elements. Thus, logically speaking, the uncertainty at the root of the early clock tree will be greater than or equal to the uncertainty at a later point on the early clock tree, and each subsequent point in the early clock tree will be less than or equal to a previous point in the early clock tree. The variance is determined based on the early clock tree that was generated. Thus, the early clock tree is analyzed to determine arrival times at endpoints based on the circuit elements that are downstream of the selected location (e.g. clock gates, buffers, and/or inverters).

After the uncertainty value is generated for the selected location or after it is determined that the selected location does not meets the criteria for generation of an uncertainty value at 403, the process proceeds to 405 where it is determined whether there are any remaining candidate locations pending processing. If there are no further candidate locations the process ends at 406, whereas if there are additional candidate locations for processing then the flow returns to 402.

Figure 5:
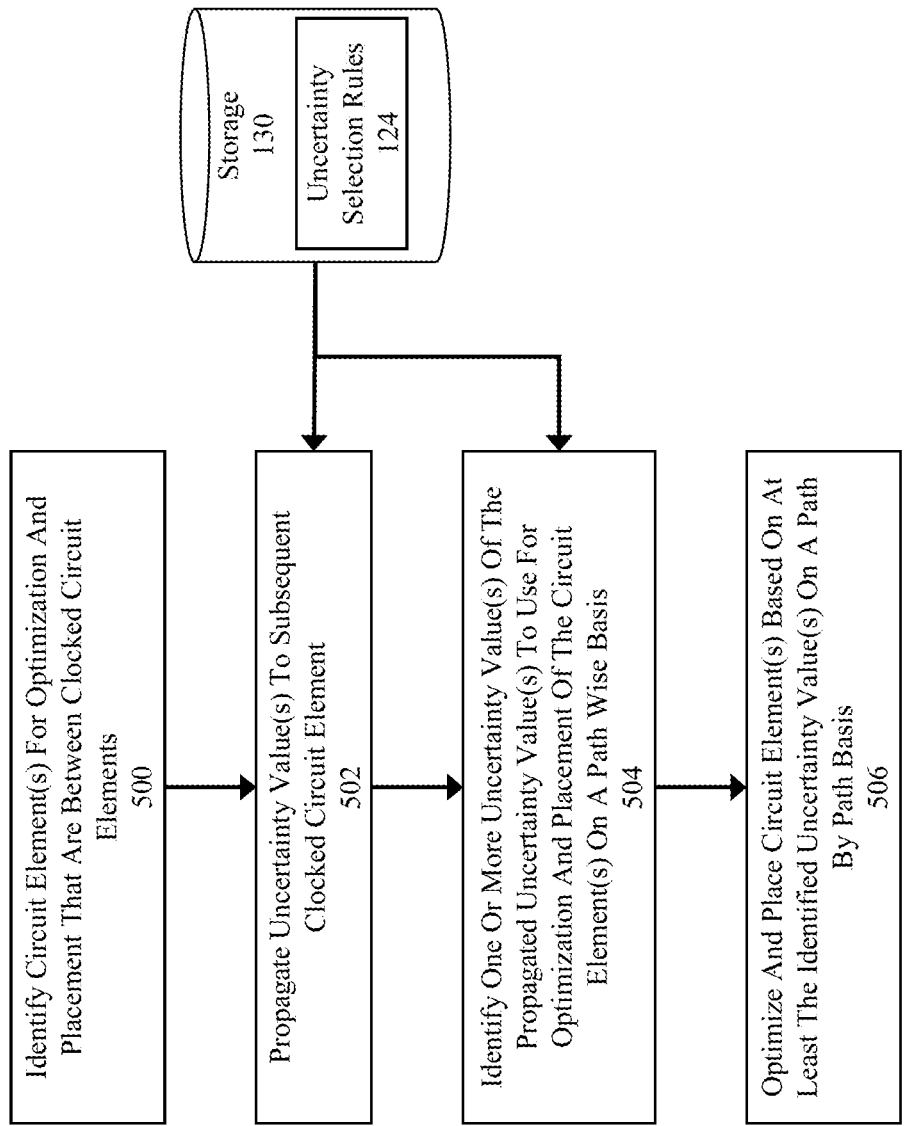
FIG. 5 illustrates a more detailed flow for identifying placement locations based on one or more of the multiple clock tree uncertainty values as in 304 of FIG. 3 according to some embodiments.

FIG. 5 illustrates a more detailed flow for identifying circuit elements for optimization and placement based on one or more of the multiple clock tree uncertainty values on a path by path basis as in 304 of FIG. 3 according to some embodiments. Generally, the process operates by propagating corresponding uncertainty values between clocked elements along data paths that connect those components, identifying respective uncertainty values that correspond to respective paths, optimization of the circuit elements along those respective paths to meeting timing requirements as determined based on a corresponding uncertainty value, and placement of those optimized circuit elements based on the corresponding uncertainty value.

The flow starts at 500 where circuit elements (e.g. combinational logic) between clocked circuit elements are identified for optimization and placement. For example, one or more circuit elements between at least two clocked elements (e.g. flip-flops and/or latches) are identified as corresponding to a respective path. In some embodiments, elements might be identified and grouped logically in a management dataset to specify the elements that are to be processed together. In some embodiments, the entire design or a portion thereof is processed to identify digital, as in clocked, circuit elements which include combinatorial/glue logic between the specific clocked elements (e.g. flip-flops and/or latches) in-line with the selection of uncertainty values to propagate at 502.

At 502, uncertainty values are propagated between clocked elements. For instance, for each signal path (e.g. data or control signals) between clocked elements, the uncertainty value for the starting clocked element is propagated along that signal path—e.g. by annotating the path with the corresponding uncertainty value(s) or a reference to the corresponding uncertainty value(s). Generally, each path will be associated with at least one uncertainty value. In the event that a respective path does not intersect with another path that is associated with a different uncertainty value, then that path can be associated with and only with the one uncertainty value. This can be represented using any of the techniques disclosed herein such as via tags, database constructs (lists, tables, etc.) etc. Additionally, this could be represented by identifying the clock gating element at the start of the path (e.g., a reference to or identification of a source gate or starting clocked point) being analyzed which can in turn be used to map that path to a corresponding uncertainty value. However, in the event that the signal path intersects with another signal path there are essentially two options. The first option and more accurate option is to propagate the uncertainty value or information corresponding to the uncertainty value for both paths. In this way, when the placeopt process is analyzing a respective path, that path can be processed using the uncertainty value, or some combination thereof that the process determines to be most appropriate. Alternatively, an uncertainty value from the multiple uncertainty values, or some combination thereof, is selected at the intersection for propagation based on one or more rules from the uncertainty selection rules 124 from storage 130. For example, if the uncertainty values for the intersecting signal paths are equal then either one is selected at random or based on a standard convention (e.g. the first encountered uncertainty value or the last accessed uncertainty value). If the uncertainty values differ from each other, then any of the following are selected: the greater uncertainty value, a lowest uncertainty value, an average of the uncertainty values, both/all uncertainty values, or a weighted combination thereof. Generally, the greater uncertainty value would be selected for as a worst-case scenario. However, in the event that the process is configured to be more aggressive in the timing assumptions, any of the other rules could be applied. Eventually one or more selected uncertainty values or representation/references thereof are propagated to a receiving clocked element for use in optimization and placement of the corresponding circuit elements.

At 504, an uncertainty value of the propagated uncertainty value(s) is identified for use in optimization placement for corresponding circuit element(s) on a path wise basis. For example, each path between one or more starting points and one or more endpoints are analyzed to determine which uncertainty value to apply along one or more paths in an approach as described below in regard to 506. For example, where paths associated with different uncertainty values do not intersect there should simply be one uncertainty value to use that should be identified by the propagate value or reference thereto. However, where paths intersect, the approach identifies which uncertainty value to use for analysis of each path based on the uncertainty selection rules 124. The uncertainty selection rules might comprise rules to select an uncertainty value common to both paths might be used, an uncertainty value for a first path might be used when analyzing a first portion of the path, and an uncertainty value for the second path might be used when analyzing a second portion of the path, and or some combination thereof. For example, an uncertainty selection rule might comprise logic that specifies the use of an uncertainty value for a location in the early clock tree the path which comprises a nearest uncertainty value in the early clock tree that corresponds to both intersecting paths (e.g. an uncertainty value at a branching in the early clock tree where the clock signal for the corresponding paths diverge). Thus, the process at 504 might identify a plurality of paths and a corresponding uncertainty value for each path for use at 506.

At 506, the circuit elements are optimized and placed within the layout are based on at least the identified uncertainty value(s) for those circuit elements as they are processed on a path by path basis. For example, each path between one or more starting points and one or more endpoints are analyzed to determine whether a current or base design for the path(s) meet timing requirements as determined by at least in part the corresponding uncertainty value. In one embodiment, each path is analyzed for timing closure to determine whether there is a threshold amount of slack at each endpoint. In the event that any one of those paths do not meet the necessary timing requirements, the processes will automatically attempt to determine one or more optimization operations to achieve timing closure for each path. These operations might comprise any of insertion or deletion of circuit elements, resizing one or more circuit elements, changing the underlying logic for the circuit elements, or any combination thereof. In some embodiments, the optimizations are implemented to achieve a given set of criteria. For example, the optimization operations may be implemented based on any of an operating frequency, a frequency range, a target power consumption, a performance target, or any combination thereof. Thus, in some embodiments, circuits that have a slack that is greater than a threshold are optimized for a secondary goal such as to lower power consumption even though this may decrease the amount of slack for the corresponding path. In the event that any modification(s) are made, additionally analysis may be performed in order to verify that the modification(s) do in fact result in meeting the timing requirements. In some embodiments, the timing requirements correspond to a fixed threshold amount of slack. In some embodiments, the amount of slack required for any given path may depended on a number of circuit elements along the path, or an estimate of the total length of interconnections required. Subsequently, the uncertainty value(s) are used for determining the placement location. This process is essentially similar to that of the prior approaches in that an uncertainty value is used to determine where circuit elements should be placed with respect to each other and within the layout. However, instead of using a global uncertainty value, different subsets of the circuit (e.g. groups of circuit elements) will be associated with different uncertainty values. As a result, the placement of each circuit element should be placed in a location that is closer to a workable solution than would otherwise be possible with a placement process based on a global uncertainty value. In some embodiments, the placement of circuit elements is prioritized based on the respective slack for different paths, where the paths with less slack are placed before paths with more slack.

In some embodiments, instead of propagating the uncertainty values forward along a signal path, the signal paths are traced back to an intersecting point in the early clock tree. Subsequently, the intersection point can be used to specify the uncertainty value that should be used for the circuit elements along those signal paths for optimization and placement as discussed above.

Figure 6A:
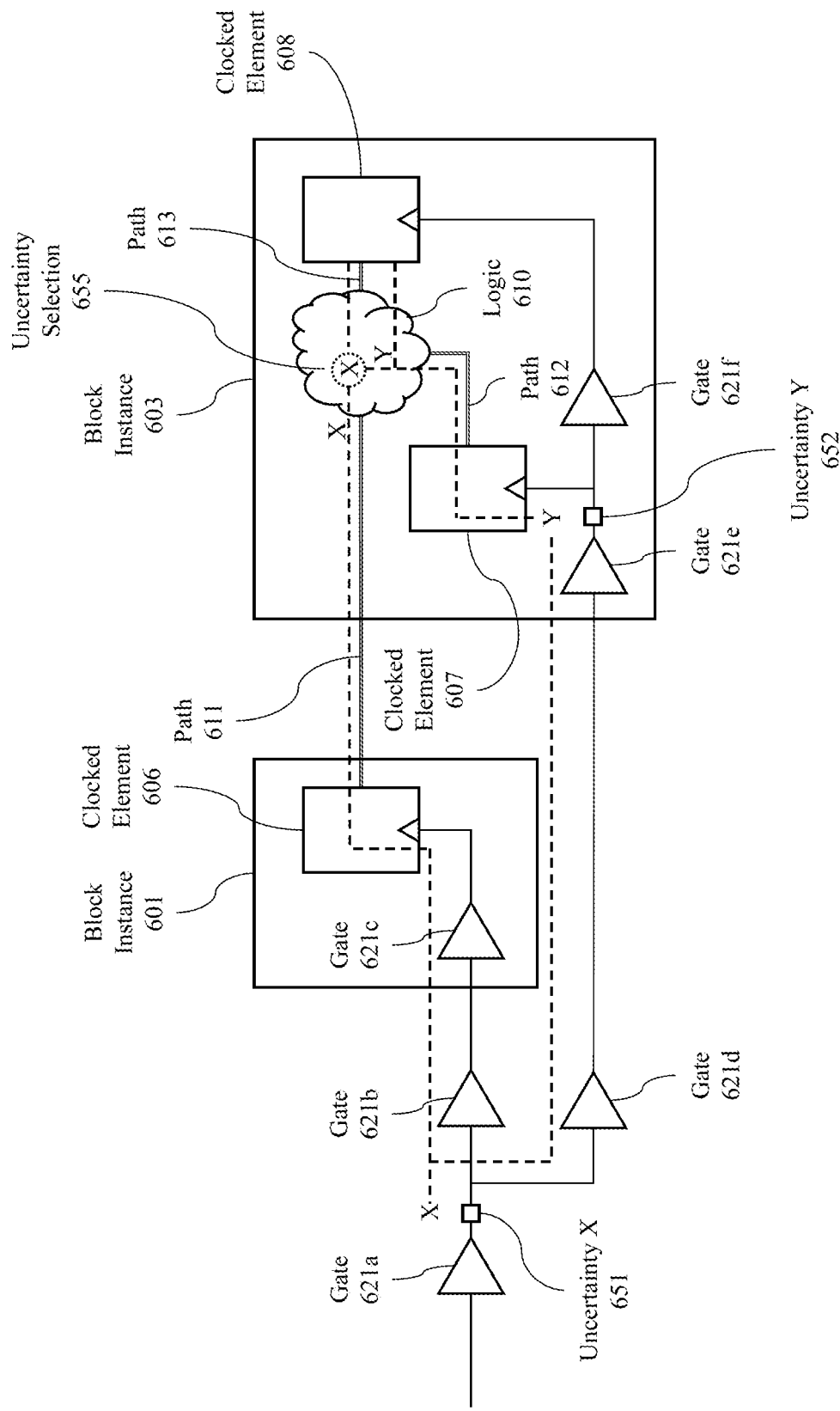
FIG. 6A-6B provide illustrative examples of a more detailed flow for the disclosed approach to placeopt physical design flow according to some embodiments.
Figure 6B:
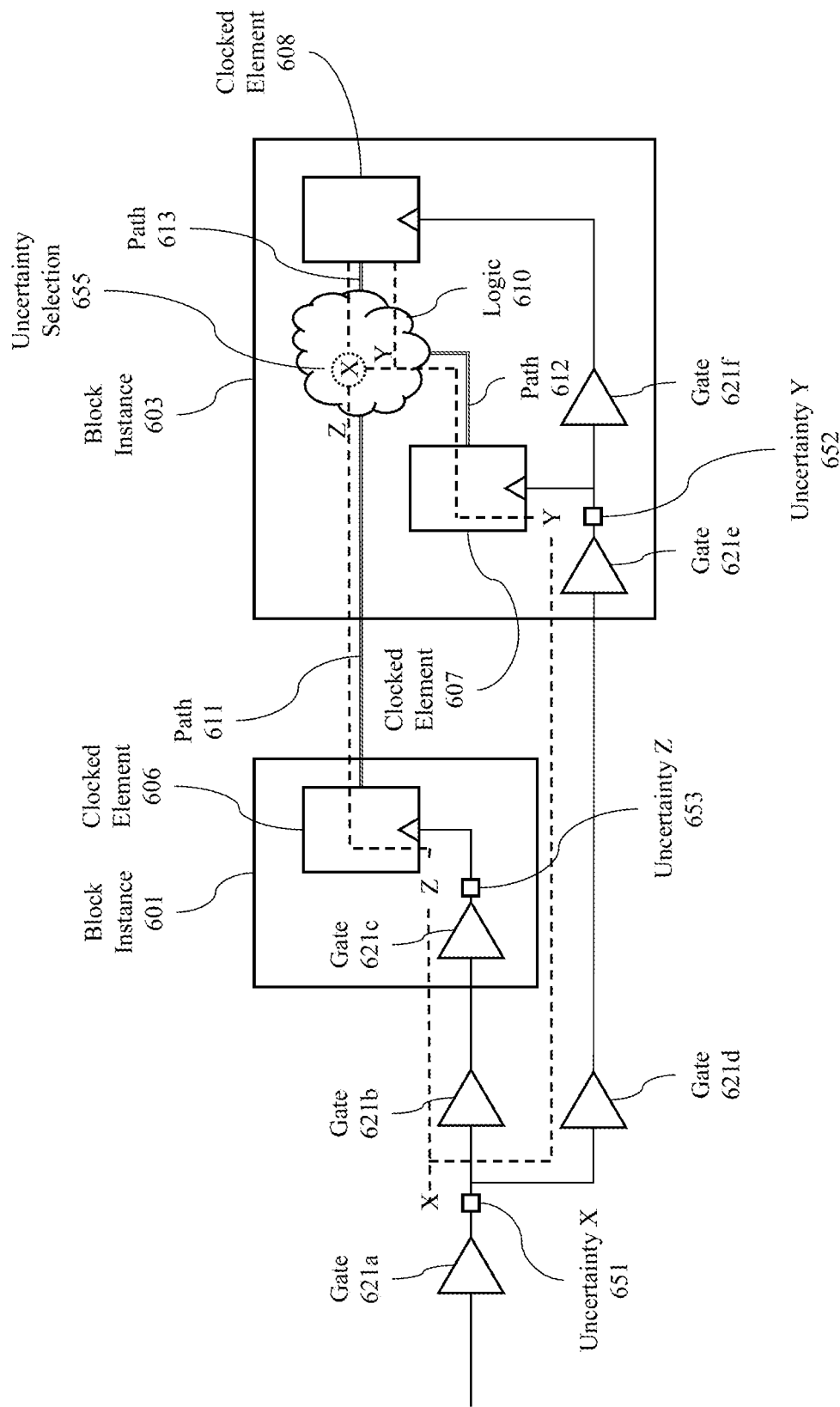

FIG. 6A-6B provide illustrative examples of a more detailed flow for the disclosed approach to placeopt physical design flow according to some embodiments.

FIG. 6A provides an illustrative example using a first possible arrangement of circuit elements to illustrate a first technique. The illustrative example represents a portion of an early clock tree having some number of gates and corresponding to two uncertainty values.

The early clock tree is represented by the gates 621*a-f* and the interconnections between those gates. Additionally, gate 621*a* has a fan-out of 2 as shown by the two gates that receive the output of gate 621*a* (see Gate 621*b* and 621*d*). The gates could comprise any combination of clock gates, buffers, and/or inverters. For example, each clock gate is provided to pass though the clock signal without altering its logic level. In addition, each clock gate might correspond to a point in a netlist and/or to a location of another branch that is not illustrated in FIG. 6A. As illustrates, the clock signal passes through gates 621*a-c* to reach a clocked element 606, through gates 621*a*, 621*d-e* to reach clocked element 607, and through 621*a*, 621*d-f* to reach clocked element 608. The clock elements 606-608 as illustrated here comprise flip-flops, but alternatively could comprise any clocked element such as a latch.

The illustration further includes uncertainty values X at 651 and Y at 652. For illustration purposes, clocked element 606 in block instance 601 is illustrated as having a data output path 611 that is input into logic 610 in block instance 603, where the data path 611 is associated with the uncertainty value X from the early clock tree. Additionally, a clocked element 607 in the block instance 603 has a data output that is also connected to logic 610. The paths 611 and 612 might insect at 655. In such an event, a determination is made to as to what uncertainty value will be used for analysis of the path(s). As illustrated here, the uncertainty value that is used is the closest uncertainty value that is in the same propagation path for the early clock tree shared by both clocked elements. For simplicity we refer to this as the common uncertainty value for the corresponding paths. For example, the earliest shared point on the early clock tree is the output of gate 621*a* which corresponds to the uncertainty value X at 651. Thus, as illustrated at 655 the uncertainty value X is selected for analysis over path 613 where path 613 involves path 611. Alternatively, if the signal path 612 did not intersect with X or a path between clocked element 607 and clock element 608 is analyzed then the uncertainty Y would be selected. In this way, the uncertainty value selected corresponds to a respective path that for which that uncertainty value is selected. As discussed previously, this could be determined by propagating a reference to each uncertainty value for paths that intersect and determining at the time of optimization and placement which uncertainty value should be used for each path being analyzed.

FIG. 6B provides an illustrative example using a second possible arrangement of circuit elements to illustrate a second technique. The illustrative example represents a portion of an early clock tree having some number of gates and two uncertainty values.

FIG. 6B is identical to FIG. 6A except for the inclusion and selection of uncertainty value Z at 653. In particular, whereas FIG. 6A illustrated X being used for path 611 and selected at the intersection of Y and X, FIG. 6B selects a different value Z along path 611. Because of this, when the intersection of the path 612 and 611 is identified (e.g. at a NAND gate) the uncertainty value Z and Y are mapped to the nearest shared uncertainty value X on the early clock tree. In some embodiments, the nearest shared uncertainty value is identified by traversing the early clock tree to identify that shared uncertainty value. In some embodiments, a data structure is maintained that maps uncertainty values to previous uncertainty values, and the data structure is then analyzed to identify the nearest shared uncertainty point. In some embodiments, each uncertainty value inherits an identification of an uncertainty value located earlier in the early clock tree, and shared/matching portion from each uncertainty value is used to identify the nearest intersection point.

System Architecture Overview

Figure 7:
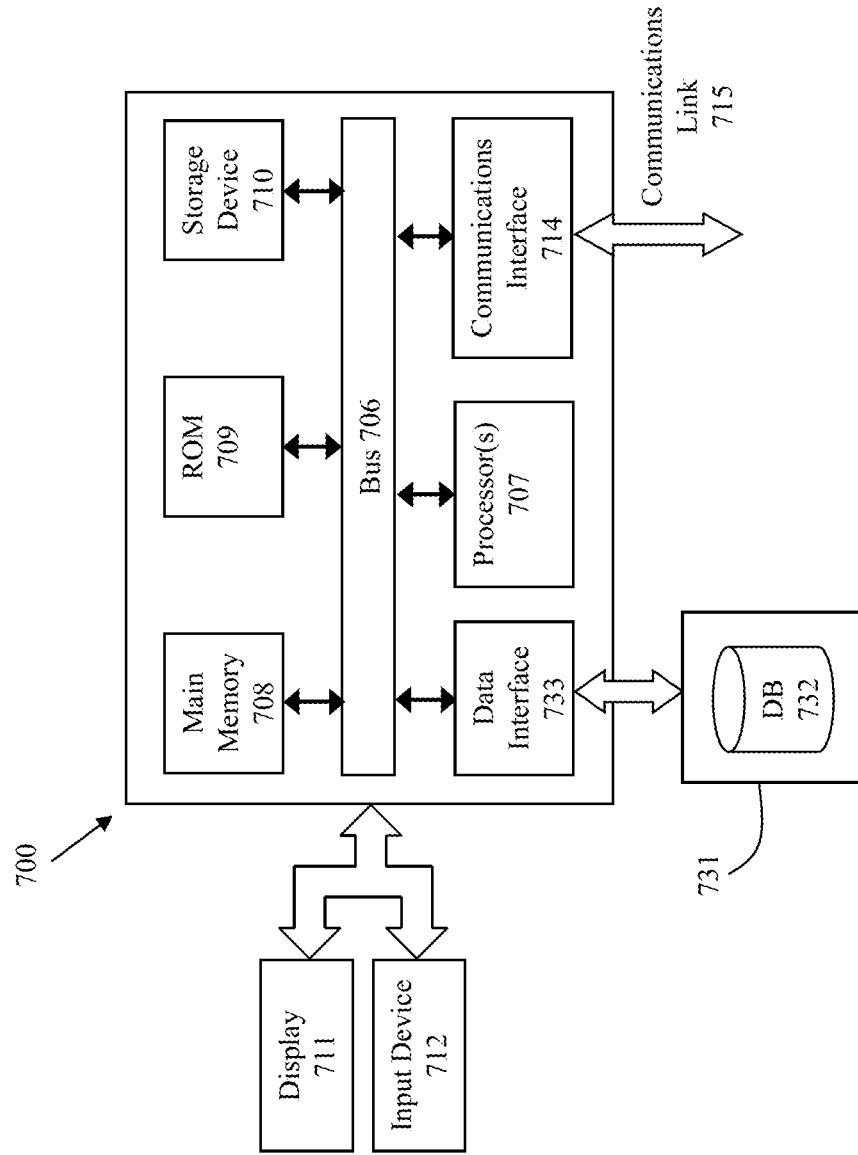
FIG. 7 shows an architecture of an example computing system with which the invention may be implemented.

FIG. 7 shows an architecture of an example computing system with which the invention may be implemented. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control.

According to one embodiment of the invention, computer system 700 performs specific operations by processor 707 executing one or more sequences of one or more instructions contained in system memory 708. Such instructions may be read into system memory 708 from another computer readable/usable medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, e.g., application code, through communication link 715 and communication interface 714. Received program code may be executed by processor 707 as it is received, and/or stored in disk drive 710, or other non-volatile storage for later execution. Computer system 700 may communicate through a data interface 733 to a database 732 on an external storage device 731.

Therefore, what has been described herein an improvement to EDA tools used to design semiconductor devices that improves performance by providing an improved approach to placeopt operations that utilizes multiple uncertainty values. This improves the quality of placeopt operations and decreases the amount of operations that might need to be taken in order to meet timing closure in a finished design and thus does not suffer from or does not suffer to the same extent to the drawbacks of prior approaches. Additionally, because the results of the placeopt process as disclosed herein are closer to the actual timing characteristics of a finished design, the optimizations can more closely match those timing characteristics and thus can provide the same or better results while resulting in the manufacture of devices that utilize less power they would have with the prior art approach.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
    identifying a synthesized netlist having circuit elements for placement;
    generating an early clock tree;
    generating multiple uncertainty values for the early clock tree before initial placement of circuit elements in a layout;
    determining initial placement locations of the circuit elements in a placeopt process on a path by path basis using the multiple uncertainty values; and
    executing clock tree synthesis after determining the initial placement locations of the circuit elements.

2. The method of claim 1, wherein the early clock tree comprises at least clock buffers, inverters, or clock gating elements.

3. The method of claim 1, wherein respective uncertainty values of the multiple uncertainty values are associated with different respective locations in the early clock tree.

4. The method of claim 1, wherein determining initial placement locations of the circuit elements in a placeopt process on a path by path basis using the multiple uncertainty values comprises identifying placement locations based on respective uncertainty values of the multiple uncertainty values.

5. The method of claim 1, wherein a plurality of candidate locations are identified in the early clock tree based on one or more features in the early clock tree and an uncertainty value is generated for a selected candidate location when the candidate location is determined to meet a criteria for generation of a respective uncertainty value.

6. The method of claim 1, wherein determining initial placement locations of respective circuit elements of the circuit elements is implemented based on an uncertainty value corresponding to a respective signal path between two clocked elements.

7. The method of claim 6, wherein the uncertainty value corresponding to the respective signal path between two clocked elements is selected using an uncertainty selection rule, the uncertainty selection rule specifying selection of an uncertainty value that is at a nearest location on the early clock tree that is shared by the two clocked elements.

8. A non-transitory computer readable medium having stored thereon a sequence of instructions which, when executed by a processor performs a set of acts, the set of acts comprising:
    identifying a synthesized netlist having circuit elements for placement;
    generating an early clock tree;
    generating multiple uncertainty values for the early clock tree before initial placement of circuit elements in a layout;
    determining initial placement locations of the circuit elements in a placeopt process on a path by path basis using the multiple uncertainty values; and
    executing clock tree synthesis after determining the initial placement locations of the circuit elements.

9. The computer readable medium of claim 8, wherein the early clock tree comprises at least clock buffers, inverters, or clock gating elements.

10. The computer readable medium of claim 8, wherein respective uncertainty values of the multiple uncertainty values are associated with different respective locations in the early clock tree.

11. The computer readable medium of claim 8, wherein determining initial placement locations of the circuit elements in a placeopt process on a path by path basis using the multiple uncertainty values comprises identifying placement locations based on respective uncertainty values of the multiple uncertainty values.

12. The computer readable medium of claim 8, wherein a plurality of candidate locations are identified in the early clock tree based on one or more features in the early clock tree and an uncertainty value is generated for a selected candidate location when the candidate location is determined to meet a criteria for generation of a respective uncertainty value.

13. The computer readable medium of claim 8, wherein determining initial placement locations of respective circuit elements of the circuit elements is implemented based on an uncertainty value corresponding to a respective signal path between two clocked elements.

14. The computer readable medium of claim 13, wherein the uncertainty value corresponding to the respective signal path between two clocked elements is selected using an uncertainty selection rule, the uncertainty selection rule specifying selection of an uncertainty value that is at a nearest location on the early clock tree that is shared by the two clocked elements.

15. A system, comprising:
    memory comprising a sequence of instructions; and
    a processor that executes the sequence of instructions to perform a set of acts comprising:
        identifying a synthesized netlist having circuit elements for placement;
        generating an early clock tree;
        generating multiple uncertainty values for the early clock tree before initial placement of circuit elements in a layout;
        determining initial placement locations of the circuit elements in a placeopt process on a path by path basis using the multiple uncertainty values; and
        executing clock tree synthesis after determining the initial placement locations of the circuit elements.

16. The system of claim 15, wherein the early clock tree comprises at least clock buffers, inverters, or clock gating elements.

17. The system of claim 15, wherein respective uncertainty values of the multiple uncertainty values are associated with different respective locations in the early clock tree.

18. The system of claim 15, wherein determining initial placement locations of the circuit elements in a placeopt process on a path by path basis using the multiple uncertainty values comprises identifying placement locations based on respective uncertainty values of the multiple uncertainty values.

19. The system of claim 15, wherein a plurality of candidate locations are identified in the early clock tree based on one or more features in the early clock tree and an uncertainty value is generated for a selected candidate location when the candidate location is determined to meet a criteria for generation of a respective uncertainty value.

20. The system of claim 15, wherein determining initial placement locations of respective circuit elements of the circuit elements is implemented based on an uncertainty value corresponding to a respective signal path between two clocked elements and the uncertainty value corresponding to the respective signal path between two clocked elements is selected using an uncertainty selection rule, the uncertainty selection rule specifying selection of an uncertainty value that is at a nearest location on the early clock tree that is shared by the two clocked elements.

* * * * *